US008315984B2

(12) United States Patent
Frandzel

(10) Patent No.: US 8,315,984 B2
(45) Date of Patent: Nov. 20, 2012

(54) SYSTEM AND METHOD FOR ON-THE-FLY ELIMINATION OF REDUNDANT DATA

(75) Inventor: Yuval Frandzel, Foster City, CA (US)

(73) Assignee: NetApp, Inc., Sunnyvale, CA (US)

( * ) Notice: Subject to any disclaimer, the term of this patent is extended or adjusted under 35 U.S.C. 154(b) by 663 days.

(21) Appl. No.: 11/691,956

(22) Filed: May 22, 2007

(65) Prior Publication Data
US 2008/0294696 A1 Nov. 27, 2008

(51) Int. Cl.
G06F 12/00 (2006.01)
(52) U.S. Cl. ........................................ 707/661; 707/698
(58) Field of Classification Search .................. 707/999, 707/626, 649, 692, 697–699, 661
See application file for complete search history.

(56) References Cited

U.S. PATENT DOCUMENTS

| 5,802,599 | A | 9/1998 | Cabrera |
| 5,990,810 | A | 11/1999 | Williams |
| 7,617,231 | B2 * | 11/2009 | Moon et al. ............................ 1/1 |
| 7,739,239 | B1 * | 6/2010 | Cormie et al. ................ 707/626 |
| 7,761,425 | B1 * | 7/2010 | Erickson et al. .............. 707/649 |
| 2004/0148306 | A1 | 7/2004 | Moulton et al. |
| 2005/0071436 | A1 | 3/2005 | Hsu et al. |
| 2007/0255758 | A1 | 11/2007 | Zheng et al. |

OTHER PUBLICATIONS

Patterson, D., et al., "A Case for Redundant Arrays of Inexpensive Disks (RAID)", SIGMOD International Conference on Management of Data, Chicago, IL, USA, Jun. 1-3, 1988, SIGMOD Record (17):3: pp. 109-16 (Sep. 1988).

U.S. Appl. No. 11/105,895, filed on Apr. 13, 2005, entitled Method and Apparatus for Identifying and Eliminating Duplicate Data Blocks and Sharing Data Blocks in a Storage System, by Zheng et al., 46 pages.
Reichenberger, C., "Delta Storage for Arbitrary Non-Text Files", Software Configuration Management Workshop, Proceedings of the 3$^{rd}$ International Workshop on Software Configuration Management, Trondheim, Norway, Jun. 12-14, 1991, ACM Press, pp. 144-152.
PCT Notification of Transmittal of the International Search Report and the Written Opinion of the International Searching Authority, or the Declaration, International Application No. PCT/US2008/006536, International Filing Date: May 22, 2008; Date of Document Mailing Sep. 29, 2008, 13 pages.
Quinlan, S., et al., "Venti: A New Approach to Archival Storage", Proceedings of the Conference on File and Storage Technologies, USENIX Association, Berkeley, CA, Jan. 28, 2002, pp. 89-101.
Kulkarni, P., et al., "Redundancy Elimination Within Large Collections of Files", Proceedings of the 2004 USENIX Annual Technical Conference, Boston, MA, Jun. 2004, pp. 1-14.

* cited by examiner

Primary Examiner — Huawen Peng
(74) Attorney, Agent, or Firm — Cesari and McKenna, LLP

(57) ABSTRACT

A system and method for "on-the-fly" de-duplication of data before storing the data in a storage system. A data de-duplication module illustratively cooperates with protocol servers and a file system of a storage operating system executing on the storage system to implement the novel de-duplication technique. The de-duplication module illustratively generates a block store, an index file and a hash table on storage space provided by the storage system. The hash table is utilized for tracking fingerprints and locations of blocks within the block store. The index file is utilized for storing directory information identifying the contents of data containers stored on the storage system, while the block store is utilized to store raw data blocks that comprise the data containers.

21 Claims, 4 Drawing Sheets

SYSTEM AND METHOD FOR ON-THE-FLY ELIMINATION OF REDUNDANT DATA

FIELD OF THE INVENTION

The present invention relates to storage systems and, more specifically, to eliminating redundant data from storage on a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

A noted disadvantage of conventional storage systems is that they typically retain a plurality of copies of the same data. For example, a memo may be distributed to all employees of a company via e-mail, thereby resulting in a copy of the memo being stored in each employee's e-mail directory. The storage of such duplicate data increases the total consumption of storage space utilized by the storage system and causes administrators to expand the physical storage space available for use by the system, thereby increasing total costs of maintaining the storage system.

One technique for achieving a reduction in data duplication (de-duplication) is described in U.S. Pat. No. 5,990,810, entitled METHOD FOR PARTITIONING A BLOCK OF DATA INTO BLOCKS AND FOR STORING AND COMMUNICATING SUCH SUBBLOCKS, by Ross Williams, issued Nov. 23, 1999 (hereafter "the '810 patent"). The method described in the '810 patent first utilizes a rolling hash function to generate a plurality of sub-blocks of data. The rolling hash utilizes a fixed size window of data that results in a boundary being placed between two subblocks. Once a block of data has been partitioned into sub-blocks, the hash value of each sub-block is calculated to form a table of hash values. The hash table is then used to determine if a new sub-block is identical to any sub-block whose hash value has previously been stored in the hash table. To perform this determination, the new sub-block's hash value is calculated and compared with the values contained in the hash table. If the new sub-block's hash value has been previously stored within the hash table, then the sub-block identified with the stored hash value is considered identical to the new subblock. In such a case, the new sub-block is replaced with a pointer to the previously stored subblock, thereby reducing the amount of storage space required for the sub-block. A noted disadvantage of the technique described in the '810 patent is that it requires performance of an extensive number of computationally intensive hashing calculations, which may affect the overall performance of a storage system implementing such a method. Another noted disadvantage is that the hash table will become larger as the size of data set increases and may not scale to large data sets such as terabytes or petabytes of data.

Another technique for eliminating duplicate data is described in U.S. patent application Ser. No. 11/105,895, filed on Apr. 13, 2005 entitled METHOD AND APPARATUS FOR IDENTIFYING AND ELIMINATING DUPLICATE DATA BLOCKS AND SHARING DATA BLOCKS IN A STORAGE SYSTEM, by Ling Zheng, et al., the contents of which are hereby incorporated by reference. In the system described in this patent application, all data de-duplication operations are performed on fixed size blocks that are illustratively 4 kilobytes (KB) in size. When a new block is to be stored, a hash is computed of the 4 KB block and compared with a hash table containing hash values of previously stored blocks. Should the new block's hash value match the previously stored block, there is a high degree of probability that the new block is identical to the previously stored block. In such a case, the new block is replaced with a pointer to the previously stored block, thereby reducing storage resource consumption.

A third technique, as mentioned in DELTA STORAGE FOR ARBITRARY NONTEXT FILES by Chris Reichenberger, In *Proceedings of the 3rd International Workshop on Software Configuration Management*, Trondheim, Norway, 1214 June 1991 (June 1991), ACM, pp. 144-152, is to use the hashes of data to find the longest common data sequence.

However, a noted disadvantage of the above-described techniques is that they require that the data first be stored on a storage system before the data de-duplication process occurs. This requires that the storage system have sufficient storage space to store the data in an un-de-duplicated form. Furthermore, additional computations are required to perform the de-duplication while still servicing other data access requests, thereby increasing the overall processing load on the storage system. This results in reduced performance and increased latency for processing data access requests.

SUMMARY OF THE INVENTION

The present invention overcomes the disadvantages of the prior art by providing a system and method for "on-the-fly" de-duplication of data before storing the data in a storage system. A data de-duplication module illustratively cooperates with protocol servers and a file system of a storage operating system executing on the storage system to implement the novel de-duplication technique. The de-duplication module illustratively generates a block store, an index file and a hash table on storage space provided by the storage system. The hash table is utilized for tracking fingerprints and locations of blocks within the block store. The index file is utilized for storing directory information identifying the contents of data containers stored on the storage system, while the block store is utilized to store raw data blocks that comprise the data containers.

When a write request is processed by the protocol servers, write data associated with the request is partitioned into one or more blocks. Illustratively, these blocks may be fixed sized or a variable length depending upon the partitioning mechanism utilized. Once data has been partitioned, a first block is selected and a fingerprint is generated for the block using a predetermined hash function, e.g., a Rabin-Karp hash function. The de-duplication module determines whether any block with the generated fingerprint has previously been stored within the block store by examining the contents of the hash table to determine if a block with an identical fingerprint has previously been stored. If no identical block has been stored previously in the block store, the block is then stored within the block store and data container indexing information is updated within the index file to identify this block as part of the data container to which the write request was directed. However, if a block having such a fingerprint has previously been stored, then the location of the stored block in the block store is identified and the appropriate data container indexing information is updated within the index file. Thus, the index file contains appropriate information indicating that this particular block is a duplicate block and that there are multiple references to the block.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

A. Storage System Environment

Figure 1:
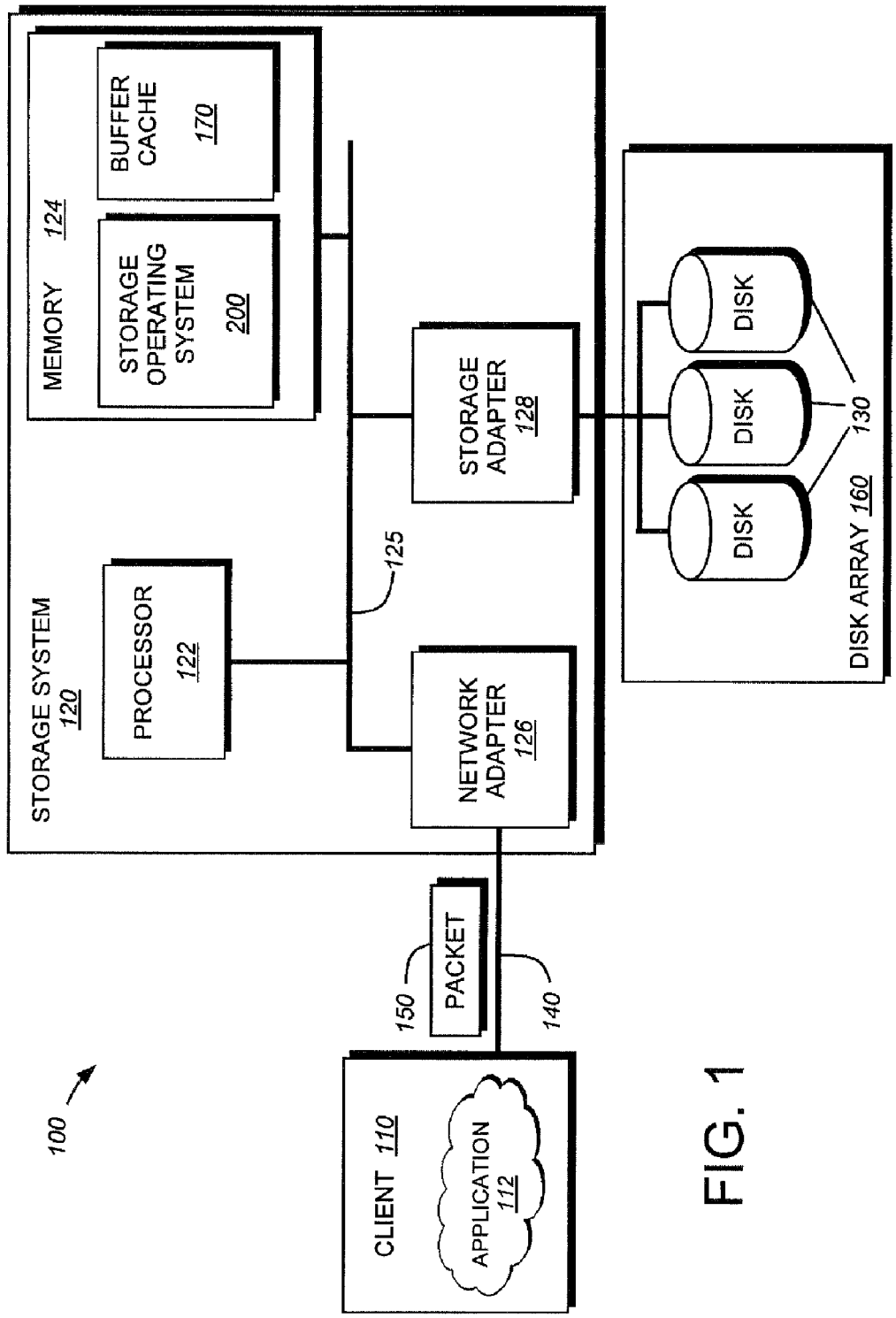
FIG. 1 is a schematic block diagram of an exemplary storage system environment in accordance with an illustrative embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 illustratively comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which is typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

In accordance with an illustrative embodiment of the present invention the storage operating system 200, described further below, implements a storage space on the disks 130. The storage space may be implemented as a volume with a file system overlaid thereon. Alternately, the storage space may comprise a raw storage space that may be managed by a deduplication module 290 (see FIG. 2) to contain a block store, a hash table and/or an index in accordance with an embodiment of the present invention. As such, the description of the storage operating system overlaying a file system or other structured storage onto disks 130 should be taken as exemplary only. In accordance with an embodiment of the present invention, storage operating system 200, including de-duplication module 290, may utilize any form of storage space for storing be duplicated data in accordance with the principles of the present invention.

B. Storage Operating System

To facilitate access to the disks 130, the storage operating system 200 illustratively implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is illustratively the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 2:
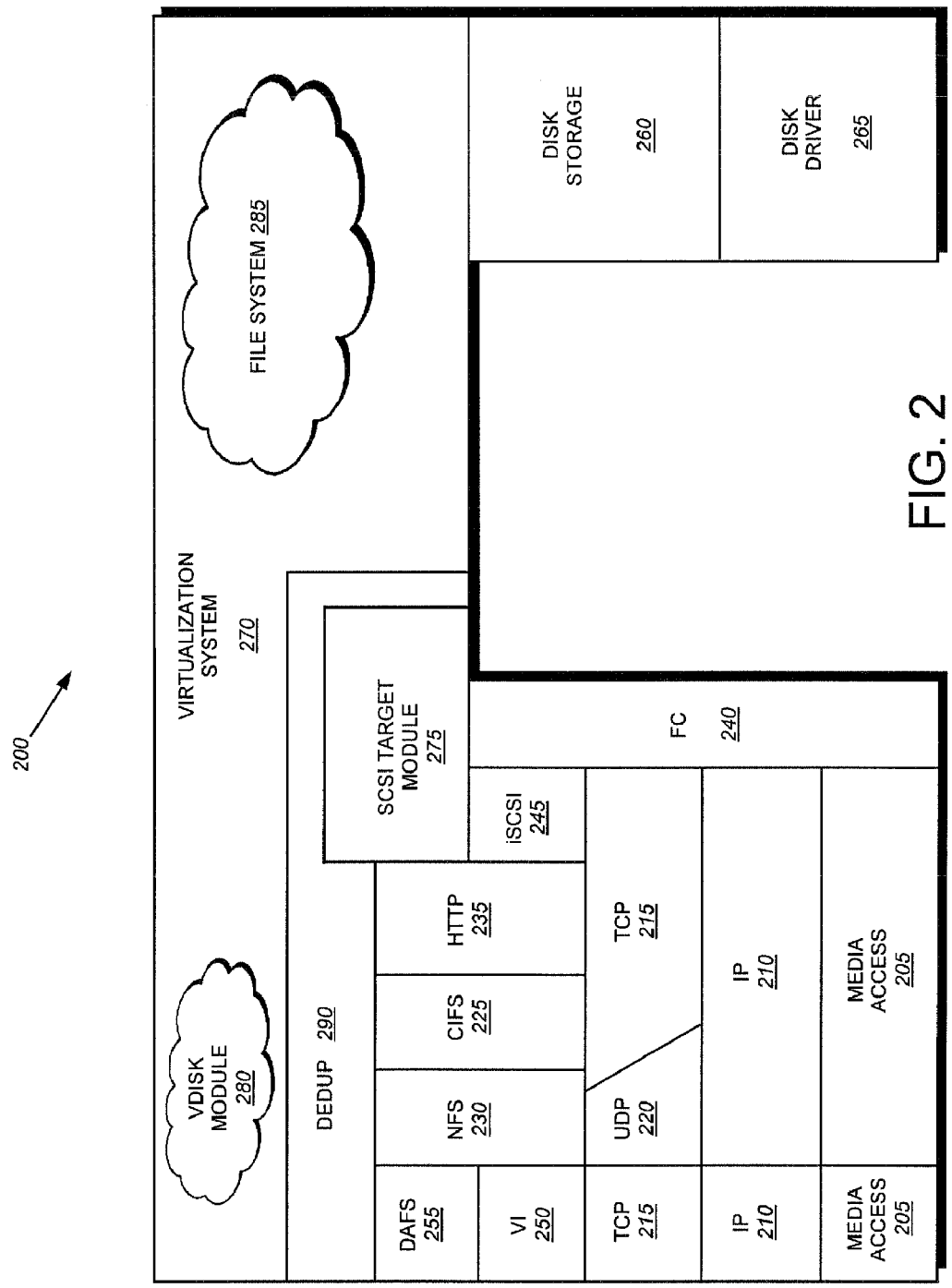
FIG. 2 is a schematic block diagram of an exemplary storage operating system that may be utilized with a storage system in accordance with an illustrative embodiment of the present invention.

FIG. 2 is a schematic block diagram of an exemplary storage operating system 200 that may be advantageously used with the present invention. The storage operating system comprises a series of software modules organized to form an integrated network protocol stack or, more generally, a multi-protocol engine that provides data paths for clients to access information stored on the storage system using block and file access protocols. The protocol stack includes a media access layer 205 of network drivers (e.g., gigabit Ethernet drivers) that interfaces to network protocol layers, such as the IP layer 210 and its supporting transport mechanisms, the TCP layer 215 and the User Datagram Protocol (UDP) layer 220. A file system protocol layer provides multi-protocol file access and, to that end, includes support for the Direct Access File System (DAFS) protocol 255, the NFS protocol 230, the CIFS protocol 225 and the Hypertext Transfer Protocol (HTTP) protocol 235. A VI layer 250 implements the VI architecture to provide direct access transport (DAT) capabilities, such as RDMA, as required by the DAFS protocol.

An iSCSI driver layer 245 provides block protocol access over the TCP/IP network protocol layers, while a FC driver layer 240 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a disk storage module 260 embodied as a RAID system that manages the storage and retrieval of information to and from the volumes/disks in accordance with I/O operations, and a disk driver system 265 that implements a disk access protocol such as, e.g., the SCSI protocol.

Bridging the disk software layers with the integrated network protocol stack layers is a virtualization system 270 that is implemented by a file system 285 interacting with virtualization modules illustratively embodied as, e.g., vdisk module 280 and SCSI target module 275. The vdisk module 280 is layered on the file system to enable access by administrative interfaces, such as a user interface, in response to a user (system administrator) issuing commands to the storage system. The SCSI target module 275 is disposed between the FC and iSCSI drivers and the file system to provide a translation layer of the virtualization system between the block (lun) space and the file system space, where luns are represented as blocks.

The file system 285 is illustratively a message-based system that provides logical volume management capabilities for use in access to the information stored on the storage devices, such as disks. That is, in addition to providing file system semantics, the file system provides functions normally associated with a volume manager. These functions include (i) aggregation of the disks, (ii) aggregation of storage bandwidth of the disks, and (iii) reliability guarantees, such as mirroring and/or parity (RAID). The file system illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. Storage systems may include, e.g., dedicated storage appliances, distributed storage systems arranged in a grid architecture, small footprint systems designed for use by small and medium businesses, etc. As such, the term storage system should be taken to mean any computer configured to perform storage functions. A storage system may be dedicated to storage functionality or may include other functionality, e.g., a file server application executing on a general purpose application server. In this sense, the Data ONTAP® software is an example of such a storage operating system implemented as a microkernel and including a file system 285 to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

A data de-duplication (dedup) module 290 of the storage operating system 200 implements "on-the-fly" data de-duplication of the present invention. Illustratively, the de-duplication module 290 is layered between the protocol servers and the virtualization system 270 to thereby enable the module 290 to intercept operations issued for the protocol servers, e.g., the NFS server 230, the CIFs server 225, etc., to the system 270. In accordance with the present invention, the de-duplication module 290 manages a block store 305, an index file 330 and a hash table 340 to implement the present invention. In an illustrative embodiment of the present invention, the de-duplication module 290 utilizes three files within the file system for storing the block store, index file and hash table. These files are managed by the file system 285 of the virtualization system 270. However, in alternate embodiments, the de-duplication module 290 may utilize any form of storage space. As such, the description of the de-duplication module interfacing with a virtualization system 270 and, more particularly with a file system 285, should be taken as exemplary only. Furthermore, in alternate embodiments the de-duplication module 290 may be integrated with the file system 285 or virtualization system 270. Thus, the description of the de-duplication module is being a separate module should be taken as an exemplary only.

C. On the Fly Elimination of Duplicate Data

The present invention provides a system and method for on the fly (i.e., real time) de-duplication of data before storing the data in a storage system. A data de-duplication module illustratively cooperates with protocol servers and a file system of a storage operating system to implement the novel de-duplication technique. The de-duplication module illustratively generates a block store, an index file and a hash table on storage space provided by the storage system. The hash table is utilized for tracking fingerprints and locations store of blocks within the block. The index file is utilized for storing directory information identifying the contents of data containers stored on the storage system, while the block store is utilized as storage space to store raw data blocks that comprise the data containers.

When a write request is processed by the protocol servers, write data associated with the request is partitioned into one or more blocks. Illustratively, these blocks may be fixed sized or variable length depending upon the partitioning mechanism utilized. Once data has been partitioned, a first block is selected and a fingerprint is generated for the block using, e.g., a Rabin-Karp hash function. The de-duplication module determines whether any block with the generated fingerprint has previously been stored within the block store by examining the contents of the hash table. If no identical block has been stored previously in the selected block store, the block is then stored within the block store and data container indexing information is updated within the index file to identify this block as part of the data container to which the write request was directed. However, if a block having such a fingerprint has previously been stored, then the location of the stored block in the block store is identified and the appropriate data container indexing information is updated within the index file. Thus, the index file contains appropriate information indicating that this particular block is a duplicate block and that there are multiple references to the block.

Figure 3:
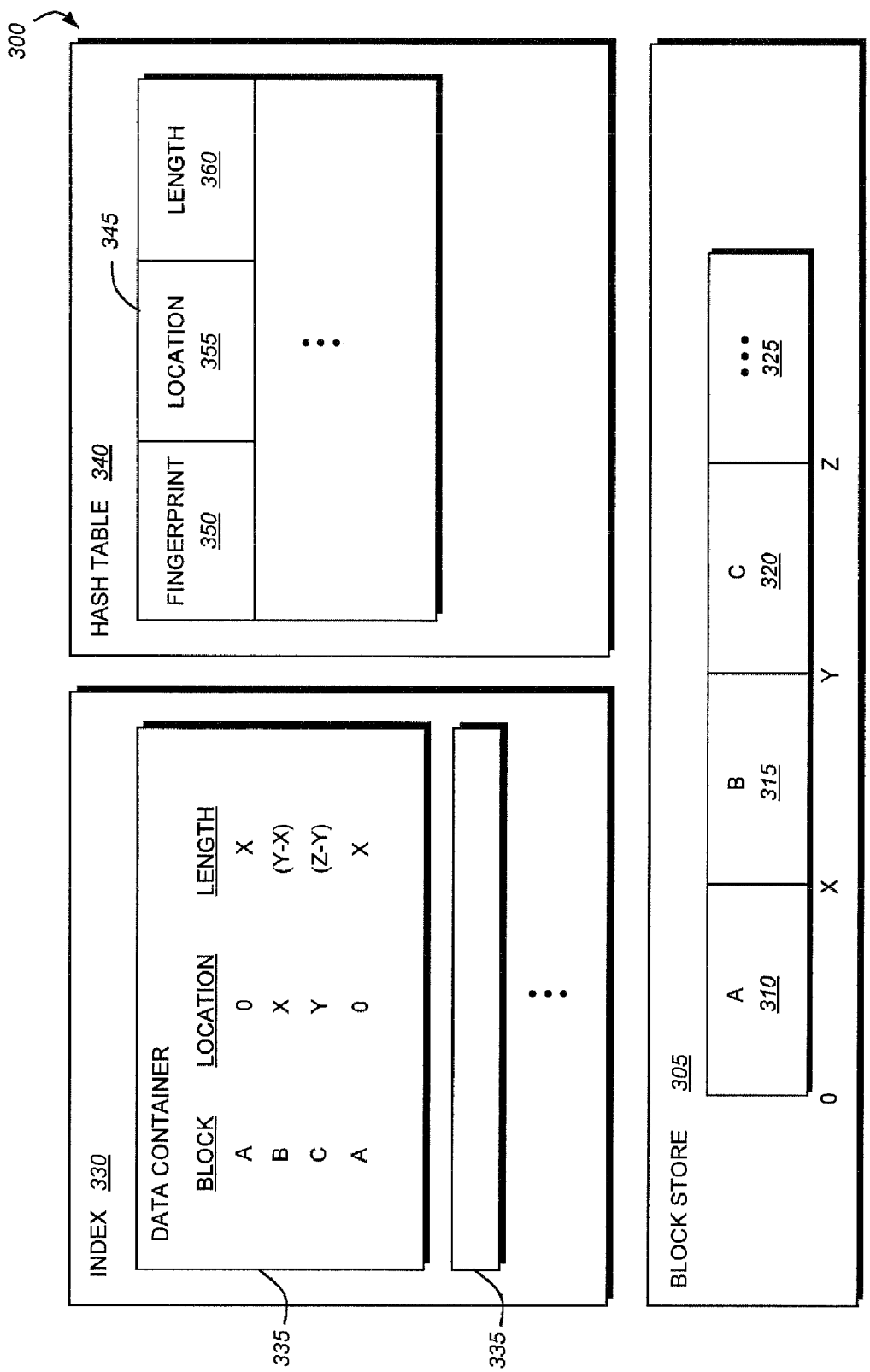
FIG. 3 is a schematic block diagram of an exemplary volume illustrating data containers stored therein in accordance with an illustrative embodiment of the present invention.

FIG. 3 is a schematic block diagram of an exemplary volume 300 showing data containers stored therein in accordance with an illustrative embodiment of the present invention. The volume 300 illustratively includes three data containers maintained by the data de-duplication module 290, i.e., a block store 305, an index file 330 and a hash table 340. The block store 305 contains a plurality of blocks including, for example blocks A, B, and C that may be of the same and/or variable length in accordance with illustrative embodiments of the present invention. Furthermore, it should be understood that additional blocks of 325 may be included within block store 305. As such, the description of block storage 305 containing three blocks should be taken as exemplary only. Illustratively the block store 305 is embodied as a file managed by file system of storage operating system 200. However, in alternate embodiments, the block store 305 may comprise any form of storage space including, e.g., a volume, a virtual disk or lun, etc.

Illustratively block A 310 is stored beginning at location 0 of the block store 305 and continues to location X where block B 315 begins. Similarly, block B ends at offset Y within the block store which is the starting point of block C 320, which ends at location Z. The blocks 310-320 are illustratively shown as being contiguous within block storage 305. However, in alternate embodiments blocks within block storage 305 may not be contiguous.

The index file 330 includes a plurality of entries 335, each entry 335 is associated with a particular data container stored by the file system in a de-duplicated state. The data container associated with exemplary entry 335 comprises four blocks, i.e., blocks ABCA. The entry 335 comprises one or more rows, each row (an index entry) identifying an order of the blocks, starting locations of the blocks and lengths of the blocks. In an alternate embodiment, the entry may contain information relating to whether a particular block has been compressed prior to storage in the block store. In this example the first block of the data container is block A which, as noted, is stored at location offset 0 within the block storage 305 and has a length X. As used herein, the term i(A) means an index entry associated with block A. Thus, i(B) references the second block (block B) which begins at offset X and has a length of Y-X. Similarly, the third block is block C which has an offset of Y in the block storage 305 and a length of Z-Y. Finally the fourth block of the data container is block A, which again has a location offset 0 and length X. Thus, in the example of the data container described by entry 335 there are two occurrences of block A. However, in accordance with novel deduplication of the present invention, only one occurrence of block A is stored in the block storage 305. Thus, by utilizing the principles of the present invention, a redundant copy of block A has been eliminated and not stored. Furthermore, should any additional block A be added to the data container associated with entry 335 the only additional data to be written within the volume 300 would be an additional row within the entry 335 identifying that a third copy of block A has been appended to the data container.

Furthermore, in an alternate embodiment, the index entries may be compacted in cases where blocks being referenced are contiguous in the block store. In particular, if a series of blocks are contiguous, then the index may reference the entire set of contiguous blocks instead of having a single index per block. For example, assume that a write operation includes the following block sequence ABCABB. If the index file stored an index (denoted by i( ) for each block, the index file entry would include the following: i(A), i(B), i(C), i(A), i(B) and i(B). If blocks A, B and C are stored contiguously within the block store 305 (as shown in FIG. 3), the entry may be compacted to include index entries that reference the contiguous blocks. For example, the data ABCABB may be represented by i(ABC), i(AB) and i(B), thereby only requiring three index entries instead of six.

The hash table includes a plurality of entries 345. Each entry 345 is associated with a particular block in the block store 305. Illustratively, each entry 345 comprises a fingerprint field 350, a location field 355 and a length field 360. The fingerprint field 350 contains the fingerprint of a particular block associated with the entry 345. The location field 355 identifies the initial offset into the block store 305 of the block associated with the entry 345. The length field 360 identifies the length of the block associated with the entry 345.

Figure 4:
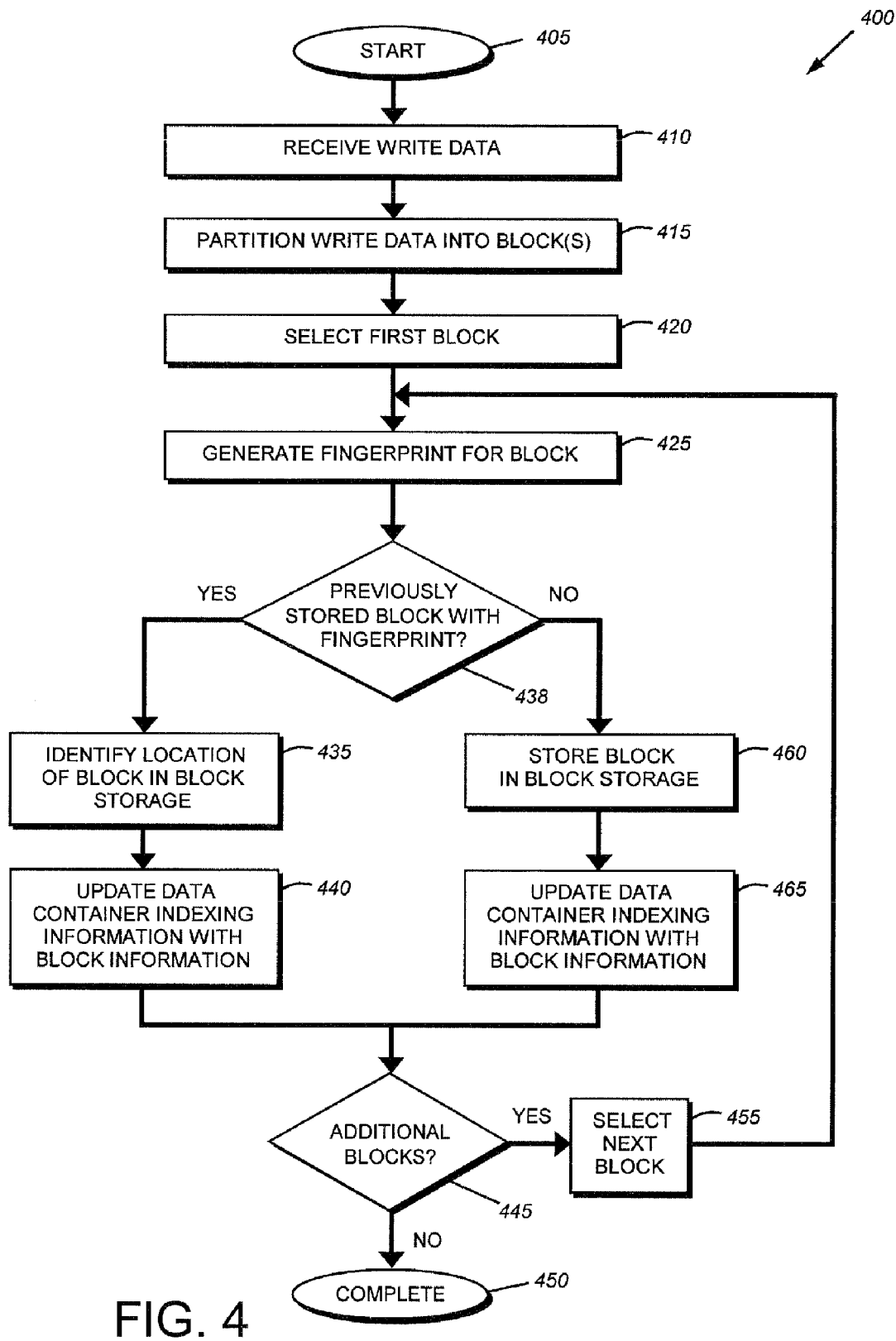
FIG. 4 is a flow chart detailing the steps of a procedure for on the fly elimination of duplicate data in accordance with an illustrative embodiment of the present invention.

FIG. 4 is a flowchart detailing the steps of a procedure 400 for "on-the-fly" elimination of duplicate data in accordance with an illustrative embodiment of the present invention. The procedure 400 begins in step 405 and continues to step 410 where write data associated with a write request is received by the de-duplication module 290. Write data may be received from any of the protocol servers within the storage operating system. Thus, for example, write data may be received via the CIF protocol layer (server) 225, the NFS protocol layer (server) 230, etc.

The write data is then partitioned by the de-duplication module 290 into one or more blocks in step 415 using any number of techniques. One technique is to utilized a predetermined fixed sized block. For example, in the exemplary WAFL file system, which operates on 4 KB file system block boundaries, incoming data may be partitioned into 4 KB blocks so that data may be de-duplicated along such block boundaries. However, in alternate embodiments differing sized blocks may be utilized. Furthermore, blocks may be partitioned into variable length blocks using any variable length partitioning technique including, e.g., those described in the above incorporated U.S. Pat. No. 5,990,810. Alternately, blocks may be partitioned using the technique described in U.S. patent application Ser. No. 11/414,600, entitled SYSTEM AND METHOD FOR SAMPLING-BASED ELIMINATION OF DUPLICATE DATA, by Ling Zheng et al., which was published as U.S. Patent Publication No. 2007/0255758 A1 on Nov. 1, 2007, the contents of which are hereby incorporated by reference. More generally, the incoming data is partitioned into blocks using a deterministic system that preferably generates identical blocks when given identical input data streams.

Once the data has been partitioned in step 415, a first block is selected in step 420. The deduplication module then generates a fingerprint for the selected block in step 425. This fingerprint is illustratively a hash-based fingerprint technique using, e.g., a Rabin-Karp fingerprint. However, it should be noted that alternate fingerprinting techniques may be utilized and, as such, the description of a Rabin-Karp fingerprint should be taken as exemplary only. More generally, the fingerprint may comprise a hash value of the block or any other deterministic technique to generate a value representative of the data contained within the block. By using a strong hash value, collisions, i.e., different blocks having identical fingerprints, may be reduced and/or eliminated. Once the block has been fingerprinted, the de-duplication module 290 determines whether there is a previously stored block with the same fingerprint in step 430. Such a determination may be made by examining a hash table 340 maintained by the duplication module. That is, the de-duplication module 290 may examine the hash table and the term is any blocks that have been previously stored there and have an identical fingerprint value. If a previously stored block has an identical fingerprint value, then depending upon the strength of the fingerprinting technique, the probability that the data container from the blocks is identical is high. Conversely, should no blocks having identical fingerprints, then there is a high probability that the identical data block had been previously stored. If there is a block previously stored having the same fingerprint, the procedure branches to step 435 where the deduplication module 290 identifies the location of the block within the block storage. Once the location is identified, the deduplication module 290 updates the appropriate data container indexing entry to identify that the block has been written to a particular data container. The data de-duplication module 290 then determines if any additional blocks are to be examined in step 445. If there are additional blocks to be examined, the procedure branches to step 455 and the next block is selected before looping back to step 425. However if no additional blocks are to be examined, the procedure completes in step 450.

However, if in step 430 it is determined that there are no previously stored blocks having the same fingerprint, the procedure branches to step 460 and the block is stored in the block storage. In an alternate embodiment, the block may be compressed prior to storage in the block store. The block may be compressed using, e.g., the LZW compression algorithm, or other suitable compression algorithms. In such an alternate embodiment, the index file may be modified to include information relating to whether a block is compressed or not. Once the block has been stored in the block store, then in step 465, the appropriate data container entry is updated to reflect the addition of the block to the data container before the procedure continues to step 445.

The foregoing description has been directed to specific embodiments of this invention. It will be apparent, however, that other variations and modifications may be made to the described embodiments, with the attainment of some or all of their advantages. It should be noted that while the above description is written in terms of volumes, the teachings of the present invention may be utilized with any form of data containers. As such, the description of volumes should be taken as exemplary only. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for operating a computer data storage system, comprising:
    maintaining a logical arrangement of storage space including a block store, an index, and a hash table, wherein
        the block store stores raw data associated with a plurality of data containers,
        the index includes a plurality of entries where each entry, associated with a data container, includes one or more references to the raw data in the block store, and
        the hash table includes one or more fingerprints associated with the raw data in the block store;
    receiving at the computer data storage system a write request directed to a particular data container and comprising write data for storage to the block store of the logical arrangement of storage space;
    partitioning the write data of the write request, directed to the particular data container, into a plurality of write blocks;
    generating a first fingerprint of a write block of the plurality of write blocks;
    determining, before the write data of the write request is stored as the raw data to the block store, whether the generated first fingerprint of the write block of the write request matches a second fingerprint stored in the hash table and associated with a previously stored block stored at the block store as the raw data; and
    in response to determining that the generated first fingerprint matches the second fingerprint associated with the previously stored block, identifying a location of the previously stored block, based on the hash table, and updating a particular entry, in the index and associated with the particular data container, to reference a location and length of the previously stored block without storing the write block to the block store; and
    in response to determining that the generated first fingerprint does not match the second fingerprint associated with the previously stored block, storing the write block in the block store as part of the raw data, and updating the particular entry, in the index and associated with the data container, to reference the write block in the block store.

2. The method of claim 1 wherein partitioning is performed based on a predetermined block size.

3. The method of claim 1 wherein partitioning comprises generating variable length blocks.

4. The method of claim 1 wherein generating the first fingerprint comprises generating a Rabin-Karp fingerprint.

5. The method of claim 1 wherein the hash table comprises of a plurality of entries, each entry comprising a fingerprint field, a location field, and a length field.

6. The method of claim 5 wherein the location field identifies an offset into the block store where the previously stored block is stored.

7. The method of claim 1 wherein each entry of the index associated with the data container comprises an ordered list of the location and the length of a particular block of the data container.

8. The method of claim 7 wherein each entry of the index references a plurality of particular blocks associated with the data container, in response to the plurality of particular blocks being contiguously stored.

9. The method of claim 1 further comprising indicating, by an index data container, that there are multiple references to the previously stored block.

10. A computer data storage system, comprising:
a logical arrangement of storage space including a block store, an index, and a hash table, wherein the block store stores raw data associated with a plurality of data containers, the index includes a plurality of entries where each entry, associated with a data container, includes one or more references to the raw data in the block store, and the hash table includes one or more fingerprints associated with the raw data in the block store;
a computer configured to execute a module; and
the module, when executed, configured to:
receive a data access request comprising data access request data directed to a particular data container and for storage to the block store of the computer data storage system,
partition the data access request data of the data access request into a plurality of data access request blocks, generate a first fingerprint of a data access request block of the plurality of data access request blocks,
determine, before the data access request data is stored to the block store whether the generated first fingerprint matches a second fingerprint stored in the hash table and associated with a previously stored block stored as the raw data to the block store,
identify, in response to determining that the generated first fingerprint matches the second fingerprint, a location of the previously stored block based on the hash table, and update a particular entry of the index and associated with the particular data container to reference the location and a lenght of the previously stored block, and
store, in response to determining that the generated first fingerprint does not match the second fingerprint, the data access request block to the block store as part of the raw data, and update the particular entry of the index and associated with the particular data container to reference the data access request block.

11. The system of claim 10 wherein the module is configured to be operatively interconnected with a file system of the computer data storage system.

12. The system of claim 11 wherein the file system provides storage space for the block store.

13. The system of claim 12 wherein the block store comprises a file in the file system.

14. The system of claim 10 wherein the hash table comprises information relating to the first fingerprint of the data access request block, the location of the data access request block, and the length of the data access request block.

15. The system of claim 10 wherein the index comprises a file.

16. The system of claim 10 wherein the index references the plurality of data access request blocks associated with the particular data container in the particular entry in response to contiguously storing the plurality of data access request blocks.

17. The system of claim 10 wherein the data access request data associated with the data access request comprises write data directed to the particular data container.

18. The system of claim 10 further comprising a storage operating system of the computer data storage system, wherein the storage operating system comprises the module.

19. The system of claim 10 wherein the index is configured to indicate multiple references to the previously stored block.

20. A computer data storage system, comprising:
a processor operatively connected to a storage system configured to execute a storage operating system;
means for maintaining a logical arrangement of storage space including a block store, an index, and a hash table, wherein
the block store stores raw data associated with a plurality of data containers,
the index includes a plurality of entries where each entry, associated with a data container, includes one or more references to the raw data in the block store, and
the hash table includes one or more fingerprints associated with the raw data in the block store;
means for receiving at the computer data storage system a write request directed to a particular data container and comprising write data for storage to the block store;
means for partitioning, by the storage operating system, the write data of the write request into a plurality of write blocks;
means for generating a first fingerprint of a write block of the plurality of write blocks;
means for determining, before the write data of the write request is stored to the block store as the raw data, whether the generated first fingerprint of the write block of the write request matches a second fingerprint stored in the has table and associated with a previously stored block stored at the block store as the raw data;
in response to determining that the generated first fingerprint matches the second fingerprint of the previously stored block, means for identifying a location of the previously stored block, based on the hash table, and updating a particular entry, in the index and associated with the particular data container, to reference a location and a length of the previously stored block without adding the write block to the block store; and
in response to determining that the generated first fingerprint does not match the second fingerprint of the previously stored block, means for storing the write block to the block store as part of the raw data, and updating the particular entry, in the index and associated with the data container, to reference the write block in the block store.

21. A non-transitory computer readable storage medium containing executable program instruction for execution by a processor, comprising:
program instructions that maintain a logical arrangement of storage space including a block store, an index, and a hash table, wherein
the block store stores raw data associated with a plurality of data containers,
the index includes a plurality of entries where each entry, associated with a data container, includes one or more references to the raw data in the block store, and
the hash table includes one or more fingerprints associated with the raw data in the block store;
program instructions that receive a write request directed to a particular data container and comprising write data for storage to the block store;
program instructions that partition the write data of the write request into a plurality of write blocks;
program instructions that generate a first fingerprint of a write block of the plurality of write blocks;
program instructions that determine, before the write data of the write request is stored to the block store, whether the generated first fingerprint of the write block matches a second fingerprint stored in the hash table and associated with a previously stored block stored at the block store as the raw data;
program instructions that, in response to determining that the generated first fingerprint matches the second fingerprint associated with the previously stored block, identify a location of the previously stored block, based on the hash table, and updating a particular entry, in the index and associated with the particular data container, to reference a location and length of the previously stored block without adding the write block to the block store; and program instructions that, in response to determining that the generated first fingerprint does not match the second fingerprint associated with the previously stored block, store the write block to the block store as part of the raw data, and updating the particular entry, in the index and associated with the data container, to reference the write block in the block store.

\* \* \* \* \*

UNITED STATES PATENT AND TRADEMARK OFFICE
CERTIFICATE OF CORRECTION

PATENT NO. : 8,315,984 B2
APPLICATION NO. : 11/691956
DATED : November 20, 2012
INVENTOR(S) : Yuval Frandzel It is certified that error appears in the above-identified patent and that said Letters Patent is hereby corrected as shown below:

In the Specifications:

Col. 10, line 48 should read: "number of techniques. One technique is to ~~utilized~~utilize a prede-"

In the Claims:

Col. 13, line 31 should read: "reference the location and a ~~lenght~~length of the previously"

Signed and Sealed this
Fourteenth Day of May, 2013

Teresa Stanek Rea
*Acting Director of the United States Patent and Trademark Office*